United States Patent [19]

Milani et al.

[11] Patent Number: 5,919,723
[45] Date of Patent: Jul. 6, 1999

[54] SUPPORTED METALLOCENE CATALYST FOR THE (CO) POLYMERIZATION OF ALPHA-OLEFINS

[75] Inventors: Federico Milani, Occhiobello; Antonio Labianco, Stienta; Bruno Pivotto, Ferrara, all of Italy

[73] Assignee: Enichem S.p.A., Milan, Italy

[21] Appl. No.: 08/777,074

[22] Filed: Dec. 30, 1996

[30] Foreign Application Priority Data

Jan. 16, 1996 [IT] Italy .................................. MI96A0057

[51] Int. Cl.⁶ ...................................... C08F 4/64
[52] U.S. Cl. ........................ 502/116; 502/104; 502/113; 502/117; 502/120; 502/131; 502/133; 502/134; 502/152; 502/155; 526/114; 526/119
[58] Field of Search ..................... 502/104, 113, 502/116, 117, 120, 131, 133, 134, 152, 155

[56] References Cited

U.S. PATENT DOCUMENTS

| | | | |
|---|---|---|---|
| 3,135,809 | 6/1964 | Bosmajian ............................... | 260/650 |
| 4,536,550 | 8/1985 | Moriguchi et al. ..................... | 525/240 |
| 5,296,432 | 3/1994 | Milani et al. ............................ | 502/113 |
| 5,310,716 | 5/1994 | Luciani et al. . | |
| 5,332,706 | 7/1994 | Nowlin et al. ........................... | 502/107 |
| 5,525,678 | 6/1996 | Mink et al. .............................. | 525/246 |
| 5,529,966 | 6/1996 | Luciani et al. . | |

FOREIGN PATENT DOCUMENTS

| | | |
|---|---|---|
| 0 439 964 | 8/1991 | European Pat. Off. . |
| 0 588 404 | 3/1994 | European Pat. Off. . |
| 0 676 418 | 10/1995 | European Pat. Off. . |

OTHER PUBLICATIONS

Ronald L. Halterman, "Synthesis and Applications of Chiral Cyclopentadienylmetal Complexes", Chem. Rev. pp. 965–994, 1992.

*Primary Examiner*—David W. Wu
*Attorney, Agent, or Firm*—Oblon, Spivak, McClelland, Maier & Neustadt, P.C.

[57] ABSTRACT

A supported catalyst for the (co)polymerization of alpha-olefins is obtained by putting the following products in contact with each other:

(A) a metallocene derivative of a metal selected from the group consisting of transition metals and lanthanides, which is in itself capable of promoting the polymerization of alpha-olefins in the presence of or also without suitable activators;

(B) an active support containing magnesium, halogen, titanium and smaller quantities of tin;

(C) an organometal derivative of aluminium of which at least 50% of the aluminium atoms are bound to at least one alkyl carbon atom.

Components (A) and (B) are preferably interacted first to obtain a supported metallocene derivative, which is then put in contact with (C) to obtain the desired catalyst. Alternatively, (B) and (C) are interacted and subsequently put in contact with (A).

28 Claims, No Drawings

SUPPORTED METALLOCENE CATALYST FOR THE (CO) POLYMERIZATION OF ALPHA-OLEFINS

The present invention relates to a supported metallocene catalyst for the (co)polymerization of alpha-olefins.

More specifically, the present invention relates to a catalytic system which is active in homo- and co-polymerization processes of α-olefins comprising a metallocene complex of a transition metal, supported on a solid comprising magnesium chloride.

It is generally known in the art that alpha-olefins can be polymerized by processes at low, medium or high pressure with catalysts leased on a transition metal, generally known as catalysts of the Ziegler-Natta type.

A particular group of these catalysts, generally having a relatively high polymerization activity, consists of a combination of an organo-oxygenated derivative of aluminium (commonly called aluminoxane) with an $\eta^5$-cyclopentadienylic derivative of a transition metal, also commonly called metallocene, definable in its more general form with the following formula:

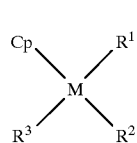

(I)

wherein M represents a metal of group 4 of the periodic table of elements, formally in the oxidation state +4, and is preferably titanium or zirconium; $R^1$ and $R^2$ each independently represent a group of an anionic nature such as, for example, a hydride, a halide, a phosphonated or sulfonated anion, an alkyl or alkoxy group, an aryl or aryloxy group, an amide group, a silyl group, etc.; Cp independently represents a binder of the $\eta^5$-cyclopentadienylic type and is generally selected from $\eta^5$-cyclopentadienyl, $\eta^5$-indenyl, $\eta^5$-fluorenyl and their derivatives variously substituted; $R^3$, independently of the nature of the other substituents, can have one of the meanings of either the binder Cp, or the $R^1$ or $R^2$ groups. "Bridged" metallocenes have proved to be of particular interest in the known art, wherein the two groups Cp and $R_3$, the same or different, are bound by a covalent bridge which usually also comprises other carbon atoms or heteroatoms. For a known method for the preparation of the above compounds, reference should be made, as an example, to the publication of H. Sinn, W. Kaminsky, in Adv. Organomet. Chem., vol. 18 (1980), page 99 and to U.S. Pat. No. 4,542,199.

The catalytic systems based on metallocenes normally allow high polymerization activities to be reached in the presence of an aluminoxane in great molar excess with respect to the metal M, with an atomic ratio Al/M usually of between 1000 and 5000. This leads to the presence of a relatively high quantity of aluminium in the polyolefins thus obtained, consequently making them unsuitable for numerous applications in which the presence of metal ions cannot be tolerated, such as, for example, when insulating properties or alimentary compatibility are required.

In addition, aluminoxanes, and in particular methylaluminoxane which is the activator normally used, require relatively difficult synthetic and conservation methods, making their use inconvenient in various applications with respect Do the less costly traditional catalytic systems based on titanium or vanadium chloride and aluminoalkyls.

A second disadvantage related to the use of metallocenes in the polymerization of olefins derives from the fact that these normally operate in solution, producing a dispersed polymer with a high content of fines and consequent difficulty of subsequent processing. To overcome this inconvenience numerous methods have been proposed for supporting metallocenes on solid materials with a controlled particle size such as silica, alumina or magnesium chloride, but these however do not fully satisfy the desired requirements owing to the difficulty in stably supporting the metallocene and also due to the diminished activity of the catalyst thus produced.

The preparation of Ziegler-Natta type catalysts is also known in the art, by interacting a compound of a transition metal, particularly a titanium alkyl or alcoxide, or a titanocene, with the solid reaction products between a magnesium alkyl and a halogenating agent, as described for example in published European patent applications EP-A 104.340, EP-A 209104 and EP-A 588.404.

Catalytic systems have also been experimented in the art, based on the combination of a metallocene or a transition metal with a solid component of catalyst containing titanium, magnesium and halogen, which are active in the presence of aluminomane, as described for example in published European patent application EP-A 439.964. Also in this case however, the problems relating to the use of metallocenes have not been completely solved, especially regarding the considerable quantity of MAO necessary for giving sufficient activity, as well as the characertistics of the polymer obtained, with respect to the molecular weights and their distribution.

Equally well-known is the preparation of catalytic components for the polymerization of olefins by the treatment of solid products deriving from anhydrous magnesium chloride, an electron-donor and titanium compounds (IV) with liquid halides of boron, aluminium, gallium, indium, tallium, tin or antimonium in the higher oxidation state, as described for example in published European patent application 29.623. A. V. Kryzhanovskii et al., Okht, Nauchno-Proizvod "Plastpolimer", Kinet. Katal. 1990, 31 (1), 108–12, suggest the modification of a catalyst based on titanium tetrachloride and magnesium chloride with tin tetrachloride to increase the reaction order with respect to the concentration of ethylene. According co the Italian patent 1.153.856, the organometal compounds of tin hydride can increase the productivity of the catalyst, when used in homogeneous catalytic systems based on compounds of vanadium, in the copolymerization of ethylene with propylene. It is also known that chlorinated compounds such as silicon tetrachloride and tin tetrachloride produce magnesium chloride by interaction with magnesium alkyls or magnesium alkyl halides. The most widely studied reaction is $MgR^1R^2$ or $MgR^3X$ with $R^4_{(4-n)}Sicl_n$, wherein $R^1$, $R^2$, $R^3$ and $R^4$ are alkylic groups and X is a halogen. Similarly Eaborn C. E. in "Organo Silicon Compounds", Butterworths Scientific Publications, London 1969; Rochov E. G. in "The Chemistry of Silicon", New York 1975; and Woorhoeve R. J. H. in "Organosilanes", Elsevier, N.Y., 1967, describe an exchange reaction between a magnesium dialkyl, or a halide of magnesium alkyl, and silicon tetrachloride, which produces a solid non-crystalline compound. None of the above publications however mentions metallocene compounds of transition metals.

The Applicant has now surprisingly found that a new group of supported metallocene catalysts is capable of polymerizing olefins with an extremely high activity, to give linear polymers with a high average molecular weight and controlled particle size, having a particularly favourable combination of rheological and mechanical properties.

A first object of the present invention consequently relates to a supported catalyst for the (co)polymerization of alpha-olefins, comprising the following components in contact with each other:

(A) a metallocene derivative of a metal selected from the group consisting of transition metals and lanthanides, capable in itself of promoting the polymerization of alpha-olefins in the presence of or without suitable activators;

(B) a solid component obtained by a process comprising the following steps:
  (i) contact, in a solution of an inert organic solvent, of a magnesium dialkyl, or magnesium alkyl halide, a tin (IV) halide and optionally also an alkyl halide, with an atomic ratio between the tin, in said tin halide, and the magnesium, in said magnesium dialkyl or magnesium alkyl halide, of between 0.1:1 and 50:1, and with a molar ratio between said optional alkyl halide and tin halide lower than or equal to 10:1, until the formation of a granular solid containing halogen, magnesium, and tin;
  (ii) contact of said granular solid and its interaction with a titanium halide, alkoxide or halogen-alkoxide, with an aL-omic ratio between the magnesium, in the granular solid, and the titanium, in the titanium compound, of between 0.01:1 and 60:1, to obtain a solid containing titanium, magnesium, halogen and tin, the metals being in the following atomic ratio: Ti/Mg/Sn=1/(0.5–60)/(0.001–5.0);

(C) an organometallic derivative of aluminium of which at least 50% of the aluminium atoms are bound to at least one alkyl carbon atom.

The term "(co)polymerization of alpha-olefins" as used hereafter in the description and claims, refers to both the homopolymerization and the copolymerization of alpha-olefins with each other or with another ethylenically unsaturated polymerizable compound.

The metallocene derivative (A) of the present invention is an organometal compound of a transition metal or a lanthanide, preferably of a metal selected from Ti, Zr, Hf and V, characterized by the presence of at least one $\eta^5$-cyclopentadienyl group co-ordinated to the metal, and by its capacity of promoting the polymerization of alpha-olefins either as such or combined with a suitable activator, normally consisting of an organo-oxygenated compound of a metal of groups 13 or 14 of the periodic table. These organo-oxygenated compounds are organometal, monomeric or polymeric derivatives, containing at least one oxygen atom bound to a metal of group 13 or 14 of the periodic table, such as, for example, aluminoxanes, especially methylaluminoxane, galloxanes or stannoxanes, which are commonly used as co-catalysts of many catalytic systems based on metallocenes.

The elements silicon and carbon, belonging to group 14 of the periodic table of elements, are not considered as metals in the context of the present invention. According to the present invention, the term "transition metals" refers to metals of groups 3 to 10 of the periodic table, whereas "lanthanides" are metals having an atomic number of between 57 and 71.

Metallocene derivatives (A) as defined above are known and have been widely described in literature. An ample description of these compounds and the methods for their preparation, which however does not limit the scope of the present invention, is provided, for example, in the publications: "Journal of organometallic Chemistry", vol. 479 (1994), pages 1–29; "Angewangte Chemie, International Edition English", vol. 34 (1995), pages 1143–1170; "Chemistry and Industry" vol.21 (1994) page 857 onwards; "Journal of Macromolecular Science, Rev. Macromolecular Physics", vol. C34(3) (1994) pages 439–514, which are just a few of the most recent ones.

Metallocenes suitable for the preparation of the catalyst of the present invention are, for example, those having the following general formula (II):

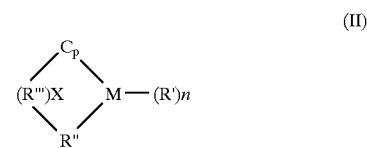

(II)

wherein: M represents a metal selected from the metals of groups 3 to 5, or of the group of lanthanides in the periodic table of elements;

$C_p$ is an anion containing an $\eta^5$-cyclopentadienylic ring co-ordinated to the metal M, each of the n R' independently represents a substituent group selected from hydride, halide, a $C_1$–$C_8$ alkyl group, a $C_3C_2$ alkylsilyl group, a $C_1$–$C_8$ cycloalkyl group, a $C_6$–$C_{10}$ aryl group, a $C_1$–$C_8$ alkoxyl group, a $C_1$–$C_8$ carboxyl group, a $C_2$–$C_{10}$ dialkylamide group and a $C_4$–$C_{20}$ alkylsilylamide group;

R" represents a substituent group of the same kind as the preceding R' groups, independently selected from these, or a second anion containing an $\eta^5$-cyclopentadienic ring co-ordinated to the metal M, R'" represents a divalent group having from 1 to 10 carbon atoms, possibly containing one or more heteroatoms, preferably O, N, P or Si, which is bridged between Cp and R" with a covalent bond. R'" is preferably selected from alkylene, dialkylsilylene, diarylsilylene, alkyl- or aryl- amino or phosphino radicals, arylene, arylene-bis-alkylene radicals and the like;

"n" is an integer and is equal to the valence of M less 2;

"x" can be 0 or 1.

In the compounds having the above formula (II), when "x" is 0 the two R" and $C_p$ groups are not bridged to each other. Typical but non-limiting examples of R'" are methylene, 1,2-ethylene, dimethylsilylene groups.

The metal M in the compound having formula (II) is preferably selected from titanium, zironcium, hafnium or vanadium. Also compounds having formula II in which M is a lanthanide have proved to be suitable for the preparation of the catalyst of the present invention.

According to the present invention, the R' groups having formula (II) can each independently represent a hydride or halide, such as chloride or bromide, a $C_1$–$C_8$ alkyl group such as, for example, methyl, ethyl, butyl, isopropyl, isoamyl, octyl, benzyl, a $C_3$–$C_{12}$ alkylsilyl group such as, for example, trimethylsilyl, triethylsilyl or tributylsilyl, a cycloalkyl group such as cyclopentyl or cyclohexyl, a $C_6$–$C_{10}$ aryl group such as phenyl or toluyl, a $C_1$–$C_8$ alkoxyl group such as, for example, methoxyl, ethoxyl, iso- or sec-butoxyl, or a $C_2$–$C_{10}$ dialkylamide or $C_4$–$C_{20}$ alkylsilylamide group, preferably of the type which can be represented with the general formula —NR$^4$R$^5$ wherein R$^4$ and R$^5$ are alkyl groups having from 1 to 4 carbon atoms, such as for example, methyl, ethyl or butyl groups, or, in the case of alkylsilylamides, alkylsilyl groups having from 3 to 6 carbon atoms, such as for example, trimethylsilyl or triethylsilyl. The R' groups, when "n" is equal to 2, can also be joined to each other with a covalent bond to form a cyclic structure comprising the metal M. (R')$_2$ groups of this latter type are, for example, 1,4-tetramethylene, ethylenedioxide or malonate groups.

The R' groups having formula (II) preferably represent a radical selected from chloride, methyl, benzyl and diethylamine.

In a particularly preferred form the R' groups are equal to each other.

According to the present invention, the C$_p$ group in formula (II) is an anion containing an $\eta^5$-cyclopentadienylic ring which can be obtained by the extraction of a H$^+$ ion from the cyclopentadienyl ring of the compound having the corresponding neutral molecular structure. C$_p$ preferably represents cyclopentadiene, indene or fluorene, or a derivative of one of the above compounds, wherein one or more carbon atoms of the molecular skeleton (included or not in the cyclopentadienyl ring), are substituted with C$_1$–C$_8$ alkyl or silylalkyl groups, or C$_6$–C$_{10}$ aryl or aryloxy groups, or C$_1$–C$_8$ alkoxyl groups. This C$_p$ group can also be condensed with one or more other aromatic rings as in the case, for example, of 4,5-benzoindenyl. Typical, but non-limiting, examples of these C$_p$ groups are cyclopentadienyl, indenyl, a 5,6,7-tetrahydroindenyl, fluorenyl groups and the corresponding methylsubstituted groups.

As previously defined, R" in formula (II) can represent either a group included in the above definition of group R', or preferably, a group included in the above definition of C$_p$ in this latter case R" can be indifferently a cyclopentadienyl anion the same as or different from C$_p$.

When "x"=1, the group R" is bound to the C$_p$ group by the bridge R''', in which case it evidently represents a group included in the definition of R' or, C$_p$, respectively, but having a position substituted by the bond with the bridge R'''.

Metallocenes having the above formula (II) are generally known in the art and can be prepared with one of the usual methods suitable for the case, described in specific literature on metallocenes, such as, for example, the references previously mentioned, or in the vast patent literature relating to the use of metallocenes in the polymerization of olefins, generally known to experts in the field.

Non-limiting examples of suitable metallocene compounds of the present invention are the complexes having the following formulae:

| | |
|---|---|
| ($\eta^5$-C$_5$H$_5$)$_2$TiCl$_2$ | ($\eta^5$-THInd)$_2$ZrCl$_2$ |
| ($\eta^5$-C$_5$H$_5$)$_2$ZrCl$_2$ | [1,2-en($\eta^5$-Ind)$_2$]ZrCl$_2$ |
| ($\eta^5$-Ind)Zr(NMe$_2$)$_3$ | [Ph$_2$Si($\eta^5$-Ind)$_2$]ZrCl$_2$ |
| [Me$_2$Si($\eta^5$-Ind)$_2$]HfCl$_2$ | [Pr$^i$($\eta^5$-C$_5$H$_5$)($\eta^5$-Flu)]ZrCl$_2$ |
| [Me$_2$Si($\eta^5$-C$_5$Me$_4$)(NBu$^t$)]TiCl$_2$ | ($\eta^5$-C$_5$H$_5$)$_2$ZrCl(NMe$_2$) |
| ($\eta^5$-C$_5$Me$_5$)$_2$ZrMe$_2$ | ($\eta^5$-C$_5$H$_5$)$_2$TiClMe |
| [1,2-en($\eta^5$-THInd)$_2$]ZrMe$_2$ | [1,2-en($\eta^5$-Ind)$_2$]TiMe$_2$ |
| ($\eta^5$-C$_5$Me$_5$)TiCl$_3$ | [o-xen($\eta^5$-Ind)$_2$]ZrCl$_2$ |

In the above formulae the following abbreviations were used: Me=methyl, Et=ethyl, Bu$^t$=tert-butyl, Bz=benzyl, Pr$^i$= 2, 2-isopropylidene, Ind=indenyl, THInd=4,5,6,7-tetrahydro-indenyl, Flu=fluorenyl, 1,2-en=1,2-ethylidene, Ph$_2$Si=diphenylsilylene, Me$_2$Si=dimethylsilylene, o-xen= ortho-xylylene.

Component (B) of the catalyst of the present invention consists of the active solid on which the metallocene (A) is supported. It contains magnesium, titanium, halogen (preferably chlorine) and smaller quantities of tin. To obtain the special characteristics of this active support, its preparation process comprising steps (i) and (ii), as previously outlined, is critical, according to the present invention.

In step (i) of this process a granular solid is precipitated from a solution, in an inert organic solvent, of a magnesium dialkyl or magnesium alkyl halide, a tin halide and possibly also an alkyl halide.

Magnesium dialkyls suitable for the purpose are preferably compounds definable with the formula MgR$^4_p$R$^5_{(2-p)}$, wherein R$^4$ and R$^5$ each independently represent an alkyl group, linear or branched, containing from 1 to 10 carbon atoms and "p" is a decimal number between 0 and 2. Specific examples of magnesium dialkyl are: magnesium diethyl, magnesium ethyl butyl, magnesium dihexyl, magnesium butyl octyl and magnesium dioctyl.

Magnesium alkyl halides suitable for the purpose are preferably compounds having the formula MgR$^6_q$X$_{(2-q)}$, wherein R$^6$ represents an alkyl group, linear or branched, containing from 1 to 10 carbon atoms, X is a halogen, preferably chlorine, and "q" is a decimal number equal to or greater than 0.5 and less than 2. Typical examples are magnesium alkyl chlorides (or Grignard reagents) such as magnesium ethyl chloride or magnesium butyl chloride.

Magnesium dialkyls or magnesium alkyl halides suitable for the present invention are known compounds and the methods for their preparation are generally described in organometal chemical treatises of magnesium, as for example, in the publication of J. G. Eisch and R. B. King, on "Organometallic Syntheses", vol.2 (1981), ed. Academic Press.

Tin halides which are suitable for the purpose are tin chlorides and bromides and tin tetrachloride is preferably used. Preferably, in step (i), an atomic ratio between the tin and magnesium within the range of 1:1 and 15:1. is used.

Possible alkyl halides suitable for the purpose are alkyl chlorides and bromides, primary, secondary and tertiary, where the alkyl group, linear or branched, contains from 1 to 20 carbon atoms. Specific examples of alkyl halides are ethyl bromide, butyl chloride, hexyl chloride, octyl chloride and cyclohexyl chloride.

The solvents used for dissolving the above compounds are organic solvents which are liquid under the operating conditions and inert (non-reactive) towards the other components. Examples of suitable solvents are hydrocarbons, preferably aliphatic hydrocarbons having a boiling point of less than 150° C., such as for example, pentane, isopentane, hexane, cyclohexane, heptane and octane.

In a practical form of embodiment of step (i), a solution of magnesium dialkyl or magnesium alkyl halide and possibly alkylic halide in the pre-selected organic solvent, is prepared; the tin halide is added to this solution at a temperature of between −30 and +30° C.; the mixture is then maintained at a temperature of between −30 and +120° C. until a granular solid is formed. In practice, under the conditions indicated above, a practically complete precipitation is obtained in a time of about 10 minutes to 5 hours.

The granular solid precipitated in step (i) is conveniently separated from the liquid phase and thoroughly washed with an inert liquid solvent, for example a volatile hydrocarbon solvent such as pentane, hexane or heptane.

During the precipitation reaction of step (i), according to the present invention, it was possible to assert, by X-ray analyses, that a solid product (support) is formed, consisting of a mixture of MgCl$_2$ in its $\alpha$ and $\delta$ form and a basically non-crystalline compound, again containing magnesium chloride, whose structure was not determined.

According to a particular form of embodiment of the present invention, the precipitation in step (i) is carried out in the presence of a solid material in particles, preferably consisting of a porous, granular, inorganic oxide. This porous, granular solid is preferably selected from silica, alumina, silico-aluminates, phosphated alumina, molecular sieves. Particularly preferred is microspheroidal silica (average granule diameter 20–100 μm) having a BET surface area of between 150 and 700 m²/g, a total porosity of >80% and an average pore radius of between 2 and 50 nm.

The porous granular solid is preferably suspended in the solvent in which the reaction between the tin halide and magnesium alkyl takes place. In this way, at the end of step (i), a granular solid is obtained, in which the magnesium halide is supported on an inert support, preferably having a high area per volume unit and a high porosity.

This inert support can undergo an activation process before being used in step (i), in order to obtain a surface with a morphology and chemical composition particularly suitable for the purposes of the present invention. During the activation process the humidity and hydroxide groups present on the surface of the inert support are at least partially neutralized or eliminated up to a controlled and reproducible level.

For example, this activation process can consist in a treatment with a solution of an alkylderivative or an alkylhalide of a metal selected from the metals of groups 1, 2 or 13 of the Periodic Table of Elements, such as a magnesium dialkyl, a magnesium alkylchloride, an aluminium trialkyl or an aluminium alkylchloride, in a liquid, aliphatic hydrocarbon solvent, such as pentane, isopentane, hexane, heptane and octane. It is convenient to operate with a quantity of this alkyl-derivative or alkyl-halide of between 10 and 25 parts by weight for every 100 parts by weight of granular support, putting the reagents in contact at a temperature of between −30 and 120° C., for times of between 0.5 and 5 hours, and preferably at a temperature of between 40 and 80° C., for times of between 1 and 2 hours. At the end of the treatment, the activated support is recovered, for example by filtration or decanting.

Alternatively, the granular support can be thermally activated, by heating in an inert atmosphere, at a temperature of between about 100° C. and about 800° C., for a time of from 1 to 20 hours. It is preferable to operate with a support activated by heating in an inert atmosphere (nitrogen) at a temperature of about 600° C. for a time of about 6 hours.

In another form of embodiment of the present invention, the support is activated by treatment with a solution, in an inert hydrocarbon solvent, of a tin tetrahalide, operating with a weight ratio between the tin tetrahalide and the support of between 1:1 and 20:1, at a temperature of between −30 and 60° C., for a time which is sufficient to react at least a part of the hydroxyl groups of the support, as can be verified by the attenuation or disappearance of the hydroxyl band when subjected to infra-red rays. It is preferable to operate with tin tetrachloride, at a temperature increasing from about −20° C. to room temperature (20–25° C.) for a time of 1 to 3 hours. More specifically in practice the granular support can be suspended in an inert hydrocarbon solvent, such as pentane, isopentane, hexane, heptane and octane and the resulting suspension cooled to a temperature of about −20° C. Tin tetrachloride is added to the cooled and stirred suspension, in molar excess with respect to the total of the hydroxide groups present on the surface of the support. At the end of the addition the suspension is maintained under stirring for about 1 hour at −20° C., for a further hour at 0° C. and the temperature is then left to rise to room values (20–25° C.) and the suspension is stirred at this temperature for another hour. An activated support is thus obtained which is separated from the liquid, for example by decanting, filtration or centrifugation and subjected to washing with hydrocarbon solvent, for example pentane or hexane, before being dried.

In another form of embodiment of the present invention, the inert support is silanized by treatment with a silazane (silane containing at least one atom of aminic nitrogen) such as, for example, hexamethyldisilazane, heptamethyldisilazane, nonamethyltrisilazane, 1,1,1-triethyl-3,3,3-trimethyldisilazane, etc. In particular, a suitable quantity of silazane (preferably in slight molar excess with respect to the surface hydroxide groups) is added to a suspension of the support in an inert solvent, preferably an aliphatic hydrocarbon, and the mixture is left to react for a period of between 30 minutes and 4 hours, at a temperature ranging from room temperature to 100° C., preferably at the reflux temperature of the solvent. The silanized support is then separated by filtration or decanting and dried.

In step (ii), the granular solid comprising the magnesium halide obtained as described above, is put in contact and reacted with a titanium compound selected from the halides, alkoxides and halogen alkoxides of titanium. Among the titanium alkoxides or halo-alkoxides, those in which each alkoxide group has from 1 to 20 carbon atoms are preferred. Specific examples of these compounds are: titanium tetrachloride, titanium tetrabromide, titanium tetra-n-propylate, titanium tetra-n-butylate, titanium tetra-i-propylate, titanium tetra-i-butylate and the corresponding titanium monoor di-chloro alkoxides and mono- or di-bromo alkoxides. Mixtures of two or more of the above titanium compounds can be used. The preferred titanium compound is titanium tetrachloride.

According to a practical embodiment of step (ii) the granular solid can be suspended in an inert organic solvent, such as a hydrocarbon solvent of the aliphatic type, for example hexane, heptane, octane, etc. and the titanium compound, possibly dissolved in the same solvent or in a similar solvent, is added to the suspension, or the granular solid can be directly suspended, without the solvent, in a liquid titanium compound selected from those mentioned above. The suspension thus obtained is maintained at a temperature of between 50 and 120° C. and preferably between 60 and 90° C. for a time of between 0.5 and 5 hours and preferably for about 1–2 hours. In this way a solid is obtained containing titanium, magnesium, halogen and smaller quantities of tin, which is particularly advantageous as an active support of a metallocene, which can be recovered from the relative suspension for example by evaporating the organic solvent at atmospheric pressure or at reduced pressure, or by filtration, especially if step (ii) is carried out without a solvent, and subsequent washing with a volatile solvent which is then evaporated.

Component (C) of the present invention is an organic compound of aluminium in which at least 50%, preferably at least 90% of the metal atoms are linked to a carbon alkylic atom.

This compound is preferably selected from aluminium alkyls or alkylhalides in which each alkyl group has from 1 to 10, preferably from 1 to 5, carbon atoms, and from organo-oxygenated derivatives of aluminium, particularly aluminoxanes. The catalyst of the present invention, comprising a transition metallocene, is surprisingly active both when component (C) is an aluminium alkyl or alkylhalide, and also when it is an aluminoxane, contrary to what is normally indicated in the art, according to which a metallocene is a valid catalyst for the polymerization of olefins only when it is combined with an aluminoxane. It has also been surprisingly observed that the catalyst of the present invention does not comprise a mixture of two catalytic systems, one based on titanium which can be activated with aluminium alkyl and the other based on a metallocene which can be activated with aluminoxane, but seems to consist of a single catalytic system, presumably comprising titanium, magnesium) and the metallocene, which is active both in the presence of aluminium alkyls (or alkylhalides), and in the presence of aluminoxanes.

Aluminium alkyls or aluminium alkyl halides which are suitable as component (C) of the present invention can generally be defined with the formula: $AlR^7_zZ_{3-z}$, wherein $R^7$ is a $C_1$–$C_{10}$ alkyl group, linear or branched; Z is a chlorine, bromine or iodine atom, preferably chlorine; and "z" is a number varying from 1 to 3, and is preferably between 2 and 3.

$R^7$ preferably represents an alkyl group containing from 2 to 8 carbon atoms and Z represents the chlorine atom. Non-limiting examples of these aluminium compounds are: aluminium triethyl, aluminium tri-isobutyl, aluminium tri-n-hexyl, aluminium tri-n-octyl, aluminium diethylchloride, aluminium dibutylchloride, aluminiumethyl sesquichloride, aluminium di-iso-butyl chloride and aluminium di-n-octyl chloride.

The organo-oxygenated derivatives of aluminium suitable as component (C) of the present invention are compounds in which the metal is bound to at least one oxygen atom and at least one $R^8$ organic group consisting of a linear or branched $C_1$–$C_{10}$ alkyl. According to the present invention, this organo-oxygenated derivative of aluminium is preferably an aluminoxane. As is known, aluminoxanes are compounds containing Al-O-Al bonds, with a variable ratio O/Al, which can be obtained in the art by the reaction, under controlled conditions, of an aluminium alkyl, or aluminium alkyl halide, with water or other compounds containing controlled quantities of available water, as for example in the case of aluminium trimethyl, with a salt hydrate, such as aluminium sulfate hexahydrate, copper sulfate pentahydrate and iron sulfate pentahydrate. The aluminoxanes which are preferably used for the formation of the polymerization catalyst of the present invention are oligo- or poly-meric compounds, cyclic and/or linear, characterized by the presence of repetitive units having the formula:

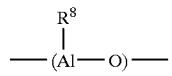

wherein $R_8$ is a $C_1$–$C_4$ alkyl group, preferably methyl.

Each aluminoxane molecule preferably contains from 4 to 70 repetitive units which need not all be equal to each other, but can contain different $R^8$ groups.

These aluminoxanes, and particularly methylaluminoxane are compounds which can be obtained with the known organometal chemical processes, for example by the addition of aluminium trimethyl to a suspension in hexane of aluminium sulfate hydrate.

According to the present invention, a mixture of an aluminium alkyl or alkylhalide and an aluminoxane can also be advantageously used as component (C).

Components (A), (B) and (C) described above can be combined in different ways, each forming a variation in the process for the preparation of the catalyst of the present invention.

A further object of the present invention therefore relates to a process for the preparation of the above catalyst for the polymerization of olefins, which comprises putting components (A), (B) and (C) in contact with each other and reacting them according to one of the following procedures:

(I) interacting components (A) and (B) to obtain a supported metallocene derivative, and subsequently interacting the product obtained with component (C); or (II) interacting components (B) and (C) to obtain a supported organometallic derivative, and subsequently interacting the product obtained with component (A).

According to a preferred form of embodiment of the first procedure of the preparation process of the catalyst, component (A) and component (B) are put in contact, preferably in the presence of an inert solvent, more preferably an aromatic or aliphatic, hydrocarbon solvent, at a temperature of between room temperature and 100° C., for a time which is sufficient to saturate the adsorption capacity of the solid support, generally between 30 minutes and 5 hours, preferably between one and three hours.

According to the present invention, components (A) and (B) are preferably combined so that the atomic ratio between the magnesium in (B) and the transition metal in (A) is between 1000:1 and 1:1.

The solid product resulting from the interaction of (A) and (B) is subsequently put in contact with (C) in such proportions that the atomic ratio between the aluminium in component (C) and the transition metals present in the solid is within the range of 10 to 5000, preferably from 50 to 2000, more preferably from 100 to 1000. This contact step between (A)+(B) with (C) is normally carried out in the presence of a liquid medium, preferably consisting of a hydrocarbon, which can also be one of the monomers which is polymerizable with the catalyst, for the times necessary for producing the desired activation, which are normally between 2 seconds and 5 minutes, at temperatures of between −50° C. and +150° C. There does not appear to be any further increase in activity for contact times of more than 5 minutes, but it is advisable for the contact between the supported component deriving from (A) and (B) and component (C) to be maintained at least until the polymerization and, possibly, even during this.

As is generally known in the art, a small portion of component (C) can also act as scavenger of the inhibiting agents of the catalyst which may be present in the polymerization environment.

In the preferred embodiment of the second procedure of the process for the preparation of the catalyst of the present invention, components (B) and (C) are mixed and maintained in contact, in the presence of an inert hydrocarbon, preferably saturated aliphatic, in the same proportions specified above for the contact step of the solid (A)+(B) with (C). The contact temperature is preferably maintained between room temperature and 100° C., for times of from 1 to 30 minutes.

The solid resulting from (B) and (C), preferably after separation from the inert liquid medium, is then interacted with component (A) basically under the same conditions previously described for the contact between (A) and (B) according to method (I). The resulting catalyst can be used as such, or, preferably, in the presence of a further portion of component (C) so that the ratio between transition metals and aluminium is still within the limits previously specified. This further portion of (C) is preferably between 10 and 50% by weight of the total amount of component (C) used.

In addition to components (A), (B) and (C), the catalyst of the present invention can comprise, if necessary or desired, all the other usual components, which are normally held suitable for optimizing the polymerization on the basis of the characteristics desired of the resulting polymer. Additives or components which can be included in the preparation and/or formulation of the catalyst of the present invention are, apart from the inert solvents already mentioned, coordinating additives (Lewis bases) such as, for example, ethers, esters, tertiary amines, alcohols, phosphines, halogenating agents such as silicon halides and the like.

The catalysts of the present invention can be used in the (co)polymerization of olefins to give linear polymers having different characteristics. Alpha-olefins which can be polymerized with the catalysts of the present invention preferably contain from 2 to 20 carbon atoms and can also comprise heteroatoms, provided this does not cause the deactivation of the catalyst. The present catalyst is preferably used in processes for the homo- and co-polymerization of 1-alkenes such as ethylene, propylene, 1-butene, 4-methyl-l-pentene, 1-octene, 1-decene, styrene and similar products, to give amorphous or crystalline polymers with a high molecular weight or also with a lower molecular weight, when desired, carrying out the polymerization under conditions suitable for the purpose, normally known in the art.

The catalysts of the present invention can be used with excellent results in the polymerization of ethylene to give linear polyethylene and in the copolymerization of ethylene with propylene or higher alpha-olefins to give copolymers having different characteristics depending on the specific polymerization conditions and on the quantity and structure of the alpha-olefin itself used as comonomer. The catalyst of the present invention can also be conveniently used for the terpolymerization of ethylene, propylene and a diene to obtain vulcanizable rubbers of the EPDM type.

The present catalysts can also be advantageously used for the stereoselective polymerization of α-olefins, preferably containing from 3 to 20 carbon atoms, to obtain iso- or syndiotactic polyolefins with a high stereo specificity. The iso- or syndio-tactic orientation basically depends on the structure of the α-olefin which is polymerized and on the type of catalyst. Catalysts are normally used in which component (A) comprises a bridged cyclopentadienyl complex. Isotactic polymers are obtained, for example, of propylene (isotactic polypropylene) and 1-butene (isotactic poly-1-butene), and syndiotactic polymers of styrene and homologous substituted products. The stereo selectivity which can be obtained with the catalysts of the present invention is very high, normally more than 98% of pentads respectively iso- or syndio-tactic, also in processes carried out at high temperatures of up to 180° C.

The catalysts of the present invention can be used with excellent results in basically all the known polymerization processes of alpha-olefins, and particularly in processes in suspension, at low, medium or high pressure and at temperatures of between 50 and 240° C., in processes in a gas phase, especially with a fluid bed, both traditional and with the introduction of a vaporizable liquid, or in processes in solution in an inert diluent normally operating at pressures of between 10 and 150 bars and temperatures of between 120 and 230° C. Hydrogen is normally used as molecular weight regulator. In all cases, the catalysts of the present invention are characterized by a distinct increase in activity compared to that obtained with normal catalysts based on component (A) alone supported on inert carriers based on inorganic oxides. It should also be pointed out that the catalyst of the present invention requires a relatively limited quantity of aluminium.

According to a particular aspect of the present invention, the improved catalyst for the (co)polymerization of alpha-olefins is prepared separately according to one of the methods mentioned above, and subsequently introduced into the polymerization environment. The catalyst can be introduced first into the polymerization reactor, followed by the reagent mixture containing the alpha-olefin and possible comonomers and additives, such as the molecular weight regulator, or the catalyst can be introduced into the reactor already containing the reagent mixture, or finally, the reagent mixture and the catalyst can be fed contemporaneously into a continuous reactor.

According to another aspect of the present invention, the catalyst is formed in situ in the polymerization reactor, for example by introducing in the desired proportions, but separately from each other, the resulting product of the interaction of components (A) and (B) from one side and component (C) from the other, possibly in the presence of an inert solvent.

The present invention is further described by the following examples which however are purely illustrative and do not limit the scope of the invention itself.

EXAMPLE 1

Preparation of the Solid Catalyst Component 200 ml of a solution containing 29.2 g (175 mmoles) of magnesium butyl octyl (BOMAG A, produced by WITCO, $Mg(C_4H_9)_{1.5}(C_8H_{17})_{0.5}$ dissolved in n-heptane are charged, in a nitrogen atmosphere, into a 500 ml flask equipped with a reflux condenser, mechanical stirrer and thermometer. 20.5 ml of tin tetrachloride (179 mmoles) are added dropwise to the solution over a period of 30 minutes under stirring, the temperature being maintained at between 0 and 20° C. The temperature is then brought to 65° C. and the mixture is left to react for about 1 hour. The formation of a solid precipitate is observed. The mixture is then cooled to 40° C. without stirring and most of the liquid is separated by siphoning. The solid is then washed two or three times with n-hexane at room temperature and finally dried under vacuum. 17.3 g of a granular white solid are obtained with an apparent density of 0.22 g/ml, containing 18.6% by weight of magnesium and 2.7% by weight of tin.

The solid thus obtained (17.3 g) is suspended in 80 ml of titanium tetrachloride, and the mixture maintained under stirring for two hours at a temperature of 90° C. After cooling to room temperature, the suspended solid is separated by filtration, thoroughly washed with n-hexane, and then dried by evaporation of the solvent under vacuum. 16.2 g of an active solid are thus obtained, containing 17.2% by weight of magnesium, 1.57% by weight of titanium and 0.78% by weight of tin, which is used as support for the metallocene component.

374 mg of bis-($\eta^5$cyclopentadienyl) zirconium dichloride [$(C_5H_5)_2ZrCl_2$, 1.13 mmoles] and 350 ml of anhydrous n-heptane are charged, in a nitrogen atmosphere, into another 500 ml flask equipped with a reflux condenser, mechanical stirrer and thermometer. The mixture is brought to a temperature 70° C. and is left under stirring until the complete dissolution of the zirconium complex. 20 g of the active support obtained as described above are then introduced into the solution, and the mixture is maintained under stirring at 70° C. for a further two hours. It is then left to cool to 40° C. without stirring and most of the liquid is separated by siphoning. The solid residue is washed with n-hexane and finally dried at room temperature by evaporation of the solvent under vacuum.

19.2 g of a solid component of catalyst according to the present invention are obtained, having a pale yellow colour and containing 16.9% by weight of magnesium, 0.48% by weight of tin, 1.22% by weight of titanium and 0.52% by weight of zirconium.

Polymerization

An autoclave with a volume of 5 litres, equipped with a magnetic anchor stirrer and electrically heated, is flushed with a nitrogen stream for 2 hours at 115° C., cooled to room temperature, fed with about 2 litres of n-hexane and heated under stirring to 40° C.

52.6 mg of the solid component prepared as above are suspended in 70 ml of n-hexane and introduced, under nitrogen, into the autoclave. A solution obtained by diluting in 30 ml of toluene a solution at 10% by weight of methylaluminoxane (MAO; produced by WITCO) corresponding to a content of 7.4 mmoles of aluminium, is subsequently added. The atomic ratio Al/Zr is in this case about 2500.

Hydrogen and ethylene are then fed into the autoclave in the established aliquots until a total pressure of 15 bars is reached. The autoclave is heated to polymerization temperature. The polymerization is carried out for the desired time, continuously feeding ethylene to maintain the pressure at a constant value of 15 bars. At the end of the polymerization the autoclave is cooled to room temperature, the non-reacted gases are removed and the suspension containing the polymer is collected. The polymer is filtered and dried in an oven at 600° C.

More specifically, in this example, the polymerization is carried out at 90° C., for a time of 1.5 hours, using 2 bars of hydrogen as molecular weight regulator. 668 g of polyethylene are obtained, having an intrinsic viscosity [η] equal to 2.88 dl/g and a monomodal molecular weight distribution, $M.I._E$ (load of 2.16 kg; 190° C.; according to ASTM D1238) equal to 0.06 g/10', $M.I._F$ (load of 21.6 kg; 190° C.; according to ASTM D1238) equal to 3.42 g/10', S.S. ($MI_F/MI_E$) equal to 57 and an apparent density of 0.32 g/ml, with a yield equal to 12.7 kg of polyethylene per gram of solid component.

EXAMPLE 2

A polymerization of ethylene is carried out under the same conditions and with the same catalytic system described in the previous example 1, with the exception that 23.3 mg of solid component and a quantity of MAO corresponding to 0.66 mmoles of aluminium, are used, with an atomic ratio Al/Zr of about 500.

At the end 534 q of polyethylene are obtained, having an intrinsic viscosity [η] equal to 3.15 dl/g, $M.I._E$ (2.16 KG; 190° C.) equal to 0.055 g/10', $M.I._F$ (21.6 kg; 190° C.) equal to 2.30 g/10', S.S. ($MI_F/MI_E$) equal to 41.8 and an apparent density of 0.233 g/ml, with a yield equal to 22.9 kg of polyethylene per gram of solid component. The particle size distribution of the polymer thus obtained is shown in table 1 below.

EXAMPLE 3

A polymerization of ethylene is carried out under the same conditions and with the same catalytic system described in example 1, with the exception that 51.2 mg of solid component and a quantity of MAO corresponding to 0.73 mmoles of aluminium, are used, with an atomic ratio Al/Zr of about 250.

At the end 732 g of polyethylene are obtained, having an intrinsic viscosity [η] equal to 2.92 dl/g, $M.I._E$ (2.16 KG; 190° C.) equal to 0.07 g/10', $M.I._F$ (21.6 kg; 190° C.) equal to 3.1 g/10', S.S. ($MI_F/MI_E$) equal to 44.3 and an apparent density of 0.28 g/ml, with a yield equal to 14.3 kg of polyethylene per gram of solid component.

EXAMPLE 4

A polymerization of ethylene is carried out under the same conditions and with the same catalytic system described in example 1, with the exception that 15 mg of solid component and a quantity of MAO corresponding to 0.43 mmoles of aluminium, are used, with an atomic ratio Al/Zr of about 500.

At the end 345 g of polyethylene are obtained, having an intrinsic viscosity [η] equal to 3.31 dl/g, $M.I._E$ (2.16 KG; 190° C.) equal to 0.075 g/10', $M.I._F$ (21.6 kg; 190° C.) equal to 2.21 g/10', S.S. ($MI_F/MI_E$) equal to 29.5 and an apparent density of 0.24 g/ml, with a yield equal to 23 kg of polyethylene per gram of solid component. The particle size distribution of the polymer thus obtained is shown in table 1 below.

EXAMPLE 5

A polymerization of ethylene is carried out under the same conditions described in example 1, using 41.7 mg of the same solid component, but introducing, as co-catalyst instead of the solution of MAO in toluene, 85.7 mg of trimethyl aluminium (TMA, 1.19 mmoles) dissolved in 30 ml of n-hexane. The atomic ratio Al/Zr in this case is about 500.

At the end, 542 g of polyethylene are obtained, having an intrinsic viscosity [η] equal to 3.15 dl/g, $M.I._E$ (2.16 KG; 190° C.) equal to 0.04 g/10', $M.I._F$ (21.6 kg; 190° C.) equal to 1.74 g/10', S.S. ($MI_F/MI_E$) equal to 43.5 and an apparent density of 0.30 g/ml, with a yield equal to 13 kg of polyethylene per gram of solid component.

EXAMPLE 6

A polymerization of ethylene is carried out operating under the same conditions as example 5 above, but using 56 mg of the solid component of example 1 and 90 mg of triethyl aluminium (TEA, 0.79 mmoles) as co-catalyst. The atomic ratio Al/Zr in this case is about 250.

At the end, 347 g of polyethylene are obtained, having an intrinsic viscosity [η] equal to 2.74 dl/g, $M.I._E$ (2.16 KG; 190° C.) equal to 0.13 g/10', $M.I._F$ (21.6 kg; 190° C.) equal to 5.91 g/10', S.S. ($MI_F/MI_E$) equal to 45.6 and an apparent density of 0.26 g/ml, with a yield equal to 6.2 kg of polyethylene per gram of solid component.

EXAMPLE 7 (COMPARATIVE)

A solid component of catalyst is prepared operating in exactly the same way as described in example 1, but with the only difference that the granular white solid containing magnesium chloride, obtained in the first step, is not suspended in titanium tetrachloride at 90° C., but is used directly for supporting the bis($\eta^5$-cyclopentadienyl) zirconium dichloride. A white solid is obtained containing 20.28% by weight of magnesium, 1.10% by weight of tin and 1.08% by weight of zirconium.

22 mg of this solid component are used for carrying out a polymerization of ethylene with an analogous procedure to that used in example 1 above. In particular, however, the polymerization is carried out in this case at 70° C., initially introducing 0.5 bars of hydrogen instead of 2 bars, and using a quantity of MAO corresponding to 6.5 mmoles of aluminium (atomic ratio Al/Zr=2500). At the end, 172 g of polyethylene are obtained having $M.I._E$ (2.16 KG; 190° C.) equal to 1.97 g/10', $M.I._F$ (21.6 kg; 190° C.) equal to 101.2 g/10', S.S. ($MI_F/MI_E$) equal to 51.4 corresponding to a yield equal to 7.9 kg of polyethylene per gram of solid component.

EXAMPLE 8 (COMPARATIVE)

A polymerization of ethylene is carried out under analogous conditions to those described in example 1, but using in this case non-supported bis-cyclopentadienyl zirconium dichloride as catalyst component. 0.5 ml of a solution in toluene of the zirconium complex (concentration 2 g/l) are then diluted with 70 ml of toluene and introduced into the autoclave. The solution containing HAO (corresponding to 8.54 mmoles of aluminium) is subsequently introduced and the same procedure is then carried out as in example 1, with the difference that the polymerization is carried out at 70° C. and 0.2 bars of hydrogen are initially introduced instead of 2 bars.

At the end, 132 g of polyethylene are obtained in the form of a fine impalpable powder, having an intrinsic viscosity [η] equal to 0.81 dl/g and M.I.$_F$ (21.6 kg; 190° C.) >100 g/10'.

It is evident that in this case a much lower average molecular weight is obtained than in the previous examples, in spite of the lower polymerization temperature and the reduced quantity of hydrogen used, as well as an unsatisfactory particle size control.

EXAMPLE 9

A solid component of catalyst is prepared basically following the same procedure described in example 1, but with the only difference that 545 mg (1.13 mmoles) of ethylene-bis($\eta^5$-tetrahydroindenyl) zirconiumdichloride [Et(THInd)$_2$ZrCl$_2$] are used instead of bis-($\eta^5$cyclopentadienyl) zirconium dichloride.

At the end of the treatment a beige-coloured solid component is obtained containing 16.3% by weight of magnesium, 0.37% by weight of tin, 1.15% by weight of titanium and 0.43% by weight of zirconium.

A polymerization of ethylene is then carried out, using the same procedure as in example 5, using 30.4 mg of solid component and a quantity of MAO corresponding to 0.71 mmoles of aluminium (ratio Al/Zr equal to about 500). At the end, 517 g of polyethylene are obtained, having an intrinsic viscosity [η] equal to 2.92 dl/g, M.I.$_E$ (2.16 KG; 190° C.) equal to 0.07 g/10', M.I.$_F$ (21.6 kg; 190° C.) equal to 2.9 g/10', S.S. (MI$_F$/MI$_E$) equal to 41 and an apparent density of 0.29 g/ml, with a yield equal to 17 kg of polyethylene per gram of solid component.

EXAMPLE 10

Preparation of the Solid Component of Catalyst 10 g of silica (Grace Davison, type SD 3216-30) are subjected to activation treatment in two steps comprising first heating to 600° C. for 4 hours in a nitrogen stream and subsequently a silanization treatment by reaction, in an inert atmosphere and in the presence of 20 ml of n-hexane as solvent, with 0.88 ml of hexamethyldisilazane (C$_6$H$_{19}$Si$_2$N, abrev.HMDS).

5 g of the silica treated as above, and 30 ml of n-heptane anhydrous at room temperature are charged, in a nitrogen atmosphere, into a 100 ml flask equipped with a reflux condenser, mechanical stirrer and thermometer. 4.4 ml of a solution of BOMAG in n-heptane (WITCO, 3.85 mmoles) are added to this suspension which is then heated under stirring for 1 hour to 60° C. The mixture is then cooled to 0° C. and 0.46 ml of SnCl$_4$ (3.92 mmoles) are added, under stirring, making sure that the reaction temperature does not exceed 25° C. The suspension thus obtained is heated under stirring for 2 hours to 70° C., and subsequently cooled to 30° C. The suspended solid is filtered and washed with 10 50 ml aliquots of anhydrous n-heptane. It is then dried under atmospheric pressure for 1.5 hours and at 85° C. to finally obtain 5.2 g of a light ivory-coloured solid, containing 1.63% by weight of magnesium and 2.35% by weight of tin.

The solid thus obtained (5.2 g) is suspended in 30 ml of titanium tetrachloride, in an inert atmosphere, and the mixture maintained under stirring for two hours at a temperature of 90° C. The suspended solid is separated by filtration, washed with n-heptane at 90° C. and then with n-hexane at room temperature, and finally dried by evaporation of the solvent under vacuum. 5.5 g of a sand-coloured solid are thus obtained, containing 1.32% by weight of magnesium, 2.33% by weight of titanium and 0.11% by weight of tin, which is used as support for the metallocene component.

Separately, 63 mg of bis-($\eta^5$-cyclopentadienyl) zirconium dichloride (0.22 mmoles) are dissolved in 50 ml of anhydrous n-heptane. 4.5 g of the solid support prepared as described above, are added, to this solution and the mixture is heated to 70° C. and maintained under stirring at this temperature for 2 hours. After cooling to 30° C., the solid is filtered and washed with 4 50 ml alisuots of anhydrous n-heptane and with 2 50 ml aliguots of anhydrous n-hexane. It is then dried under atmospheric pressure for 1.5 hours at 65° C. At the end of the treatment 4.0 g of a sand-coloured solid component of catalyst are obtained, containing 1.21% by weight of magnesiumn, 0.10% by weight of tin, 1.88% by weight of titanium and 0.36% by weight of zirconium.

Polymerization 25.5 mg of the solid component of catalyst obtained as described above, are used, together with a quantity of MLAO corresponding to 2.6 mmoles of aluminium (ratio Al/Zr equal to about 2500) in a poly-merization test of ethylene carried out with basically the same procedure described in example 1. More specifically, the polymerization is carried out at 90° C., at a total pressure of 15 bars and for a time of 1.5 hours, using 0.1 bars of hydrogen as molecular weight regulator.

At the end, 255 g of polyethylene are obtained, having an intrinsic viscosity [η] equal to 5.62 dl/g, M.I.$_E$ (2.16 KG; 190° C.) equal to 0.2 g/10', M.I.$_F$ (21.6 kg; 190° C.) equal to 6.3 g/10', S.S. (MI$_F$/MI$_E$) equal to 31.5 and an apparent density of 0.26 g/ml, with a yield equal to 10 kg of polyethylene per gram of solid component. The particle size distribution of the polymer thus obtained is shown in table 1 below.

EXAMPLE 11

A polymerization of ethylene is carried out basically operating under the same conditions described in example 10, but using 40 mg of solid component and a co-catalyst consisting of a mixture, in 30 ml of toluene, of MAO in a quantity corresponding to 3.33 mmoles of aluminium and 0.86 mmoles of TIBA (ratio Al/Zr equal to about 2600).

At the end, 264 g of polyethylene are obtained, having an intrinsic viscosity [η] equal to 8.76 dl/g, M.I.$_E$ (2.16 KG; 190° C.) equal to 0.01 g/10, S.S. (MI$_F$/MI$_E$) equal to 15 and a bulk density of 0.31 g/ml, with a yield equal to 6.6 kg of polyethylene per gram of solid component.

EXAMPLE 12

A polymerization of ethylene is carried out basically operating under the same conditions described in example 10, but with the difference that 63.9 mg of solid component are used and a quantity of MAO corresponding to 1.33 mmoles of aluminium, with an atomic ratio Al/Zr of about 500. In addition an initial partial pressure of hydrogen of 2 bars is used.

At the end, 492 g of polyethylene are obtained, having an intrinsic viscosity [η] equal to 3.43 dl/g, M.I.$_F$ (21.6 KG; 190° C.) equal to 1.75 g/10, with a yield equal to 7.7 kg of polyethylene per gram of solid component. The particle size distribution of the polymer thus obtained is shown in table 1 below.

EXAMPLE 13

A polymerization of ethylene is carried out basically operating under the same conditions as example 10, using 34.5 mg of the same solid component, but introducing, as co-catalyst instead of the solution of MAO in toluene, 52 mg of TMA (0.72 mmoles) dissolved in 30 ml of n-hexane. The atomic ratio Al/Zr in this case is about 500.

At the end, 141 g of polyethylene are obtained, having an intrinsic viscosity [η] equal to 3.37 dl/g, M.I.$_E$ (2.16 KG; 190° C.) equal to 0.06 g/10', M.I.$_F$ (21.6 kg; 190° C.) equal to 1.8 g/10', S.S. (MI$_F$/MI$_E$) equal to 30 and an apparent density of 0.388 g/ml, with a yield equal to 4.1 kg of polyethylene per gram of solid component. The particle size distribution of the polymer thus obtained is shown in table 1 below.

EXAMPLE 14 (COMPARATIVE)

A solid component of catalyst is prepared operating exactly as described in example 10 above, but with the only difference that the light ivory-coloured solid containing magnesium chloride and silica, obtained in the first step, is not suspended in titanium tetrachloride at 90° C., but is used directly to support the bis(η$^5$-cyclopentadienyl) zirconium dichloride. At the end a light grey-coloured solid component is obtained, containing 1.23% by weight of magnesium, 0.57% by weight of tin and 0.53% by weight of zirconium.

23.1 mg of the solid component of catalyst thus obtained are used together with 5.19 mmoles of MAO in a polymerization test of ethylene as described in example 1. More specifically, the polymerization is carried out at 70° C., at a total pressure of 15 bars and for a time of 1.5 hours, using 0.2 bars of hydrogen as molecular weight regulator.

At the end 67 g of polyethylene are obtained having an instrinsic viscosity (η) equal to 0.83 dl/g and M.I.$_E$ (2.16 kg; 190° C.) of more than 100 g/10', with a yield equal to 2.9 kg of polyethylene per gram of solid component.

TABLE 1

| Average particle diameter (μm) | Particles sizes of polyethylene Weight percentage in the polymer | | | | |
|---|---|---|---|---|---|
| | Ex. 2 | Ex. 4 | Ex. 10 | Ex. 12 | Ex. 13 |
| more than 2000 | 30.2 | 0.0 | 0.0 | 0.0 | 0.0 |
| from 1000 to 2000 | 48.2 | 1.4 | 6.4 | 2.6 | 5.2 |
| from 500 to 1000 | 17.8 | 4.8 | 79.2 | 74.6 | 75.4 |
| from 250 to 500 | 2.6 | 29.6 | 14.2 | 21.8 | 19.4 |
| from 125 to 250 | 1.0 | 55.0 | 0.2 | 1.0 | 0.0 |
| from 63 to 125 | 0.2 | 9.2 | 0.0 | 0.0 | 0.0 |
| less than 63 | 0.0 | 0.0 | 0.0 | 0.0 | 0.0 |

We claim:

1. A supported single catalyst system for the (co) polymerization of alpha-olefins to obtain a polymer having monomodal molecular weight distribution, comprising the following components in contact with each other:

(A) a metallocene compound having the formula (II):

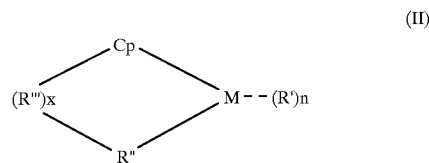

(II)

wherein: M represents a metal selected from the group consisting of titanium, zirconium and hafnium;

C$_p$ is an anion containing an η$^5$-cyclopentadienyl ring coordinated to the metal M; each R' independently represents a group selected from the group consisting of hydride, halide, C$_1$–C$_8$ alkyl, C$_3$–C$_{12}$ alkylsilyl, C$_5$–C$_8$ cycloalkyl, C$_6$–C$_{10}$ aryl, C$_1$–C$_8$ alkoxyl, C$_1$–C$_8$ carboxyl, C$_2$–C$_{10}$ dialkylamide and C$_4$–C$_{20}$ alkylsilylamide;

R" represents a group as defined for R', and is the same or different therefrom, or a second anion comprising an η$^5$-cyclopentadienyl ring co-ordinated to the metal M;

R'" represents a divalent group having from 1 to 10 carbon atoms, optionally containing one or more heteroatoms, which is bridged between C$_p$ and R" with a covalent bond;

n is an integer and is equal to the valence of M less 2;

x is 0 or 1;

(B) a solid component obtained by a process comprising the following steps:

(i) contacting in a hydrocarbon solution, a magnesium dialkyl, or magnesium alkyl halide, a tin (IV) chloride, bromide or a mixture thereof, and optionally also an alkyl halide, at a temperature of between about −30° C. to and +30° C., and then maintaining the temperature at between about −30° C. and +120° C. for a time of about 10 minutes to 5 hours, until the formation of a granular solid containing halogen, magnesium and tin; and (ii) contacting said granular solid with a titanium halide, alkoxide or halogen-alkoxide, with an atomic ratio between the magnesium, in the granular solid, and the titanium, in the titanium compound, of between about 0.01:1 and 60: 1, to obtain a solid containing titanium, magnesium, halogen and tin, the metals being in about the following atomic ratio: Ti/Mg/Sn=1/(0.5–60)/(0.001–5.0); and (C) an organometallic compound of aluminum wherein at least 50% of the aluminium atoms are bound to at least one alkyl carbon atom;

wherein components (A), (B) and (C) are used in amounts such that an atomic ratio between the magnesium in (B) and the metal in (A) is between about 1000:1 and 1:1, and an atomic ratio between the aluminum in component (C) and the metal present in (A) and (B) is in the range of about 100 and 1000.

2. The catalyst system according to claim 1, wherein, in formula (II), x is 1, R'" is selected from the group consisting of alkylene, dialkylsilylene, diarylsilylene, arylene and arylene-bis-alkylene; and R" is a second anion comprising a η$^5$-cyclopentadienyl ring co-ordinated to the metal M.

3. The catalyst system according to claim 1, wherein, in formula (II), x is 0, and R" is a second anion comprising an η$^5$-cyclopentadienyl ring co-ordinated to the metal M.

4. The catalyst system according to claim 1, wherein, in step (i) to obtain said solid component (B), a magnesium dialkyl is used, which is selected from the group consisting of compounds having the formula $MgR^4_p R^5_{(2-p)}$, wherein $R^4$ and $R^5$, each independently represents an alkyl group, linear or branched, containing from 1 to 10 carbon atoms and p is a decimal number between 0 and 2.

5. The catalyst system according to claim 4, wherein said magnesium dialkyl is selected from the group consisting of magnesium diethyl, magnesium ethyl butyl, magnesium dihexyl, magnesium butyl octyl, and magnesium dioctyl.

6. The catalyst system according to claim 1, wherein, in step (i) to obtain said solid component (B), an alkyl halide is used and is selected from the group consisting of primary, secondary or tertiary alkyl chlorides and bromides, wherein the alkyl group contains from 1 to 20 carbon atoms.

7. The catalyst system according to claim 1, wherein, in step (i) to obtain said solid component (B), the precipitation is carried out in the presence of a solid material in particle form consisting of a porous granular inorganic oxide.

8. The catalyst system according to claim 7, wherein said porous granular solid is selected from the group consisting of silica, alumina, silico-aluminates, phosphated alumina, and molecular sieves.

9. The catalyst system according to claim 8, wherein said porous granular solid is silica.

10. The catalyst system according to claim 7 or 8, wherein said porous granular solid is activated before use by a process selected from the group consisting of:

a) heating in an inert atmosphere, to a temperature from about 100° C. to about 800° C., for a time of between 1 and 20 hours, b) treatment with a solution of an alkylderivative or an alkyl-halide of a metal selected from the metals of groups 1, 2 or 13 of the periodic table of elements, in a liquid aliphatic hydrocarbon solvent, c) by treatment with a solution of a silazane in an aliphatic hydrocarbon solvent, and d) by treatment with a solution, in an inert hydrocarbon solvent, of a tin tetrahalide, until from 80 to 100% of the hydroxide groups initially present on the surface of the solid have been neutralized or eliminated.

11. The catalyst system according to claim 1, wherein, in step (ii) to obtain said solid component (B), the titanium compound is selected from the group consisting of halides, alkoxides and halogen alkoxides of titanium.

12. The catalyst system according to claim 11, wherein the titanium compound is selected from the group consisting of titanium tetrachloride, titanium tetrabromide, titanium tetra-n-propylate, titanium tetra-n-butylate, titanium tetra-i-propylate, titanium tetra-i-butylate and the corresponding titanium mono- or dichloro alkoxides and mono- or di-bromo alkoxides.

13. The catalyst system according to claim 12, wherein the titanium compound is titanium tetrachloride.

14. The catalyst system according to claim 13, wherein, step (ii) to obtain the solid component (B), is carried out in suspension in a hydrocarbon solvent, or in a liquid titanium compound, at a temperature of between 60 and 90° C. for a time of from 1 to 2 hours.

15. The catalyst system according to claim 1, wherein component (C) is an aluminium alkyl or alkylhalide, or an aluminoxane.

16. The catalyst system according to claim 1, wherein component (C) is polymeric methylaluminoxane having from 4 to 70 aluminium atoms per molecule.

17. The catalyst system according to claim 1, wherein R" is selected form the group consisting of alkylene, dialkylsilylene, diarylsilylene, alkyl-, aryl- and phosphino radicals, arylene, and arylene-bis-alkylene radicals.

18. The catalyst system according to claim 1, wherein said heteroatoms of R'" are selected from the group consisting of O, N, P and Si.

19. The catalyst system according to claim 1 wherein said tin (IV) cloride is tin tetrachloride.

20. A process for preparing the catalyst system according to claim 1, which comprises first contacting component (A) and component (B) with each other, in the presence of an aromatic or aliphatic, hydrocarbon solvent, at a temperature of between about room temperature and 100° C., for a time of between about 30 minutes and 5 hours, and subsequently interacting the product resulting from contacting (A) and (B) with component (C) in the presence of a liquid medium, for a minimum time of between about 2 seconds and 5 minutes, at temperatures of between −50° C. and +150° C.

21. The process according to claim 20, wherein said liquid medium for interacting the product of contacting (A) and (B) with component (C) is hydrocarbon.

22. The process according to claim 20, wherein components (A), (B) and (C) are put in contact in such quantities that the atomic ratio between the magnesium in (B) and the transition metal in (A) is between about 1000:1 and 1:1, and the atomic ratio between the aluminium in component (C) and the transition metals present in the product resulting from (A) and (B) is in the range of about 10 to 5000.

23. The process according to claim 22, wherein said atomic ratio between the aluminum in component (C) and the transition metals present in the product resulting from (A) and (B) is between about 100 and 1000.

24. A process for preparing the catalyst system according to claim 1, which comprises mixing and maintaining in contact said components (B) and (C), in the presence of an inert hydrocarbon solvent, at a temperature of between about room temperature and 100° C., for times of between about 1 and 30 minutes; separating the solid resulting from the interaction of (B) and (C) from the inert solvent; interacting the solid with component (A), in the presence of an aromatic or aliphatic, hydrocarbon solvent, at a temperature of between room temperature and 100° C., for a time of between 30 minutes and 5 hours.

25. The process according to claim 24, wherein components (A), (B) and (C) are put in contact in such quantities that the atomic ratio between the magnesium in (B) and the transition metal in (A) is between about 1000:1 and 1: 1; and the atomic ratio between the aluminium in component (C) and the transition metals present in the product resulting from (A) and (B) is in the range of about 10 to 5000.

26. The process according to 24 or 25, wherein component (B) is put in contact with a portion of component (C), the resulting product is interacted with component (A) and the solid thus obtained is put in contact with the remaining part of component (C).

27. The process according to claim 25, wherein the atomic ratio between the aluminum in component (C) and the transition metals present in the product resulting from (A) and (B) is between about 100 and 1000.

28. The process according to claim, 26, wherein said portion is from about 50 to 90% by weight of component (C).

* * * * *